Patented Jan. 25, 1949

2,460,239

UNITED STATES PATENT OFFICE 2,460,239

RESOLUTION OF RACEMIC α HYDROXY β,β DIMETHYL γ BUTYROLACTONE

Frank D. Pickel, Flemington, N. J., and Jacob I. Fass and Saul Chodroff, Brooklyn, N. Y., assignors to Nopco Chemical Company, Harrison, N. J., a corporation of New Jersey No Drawing. Application July 4, 1945, Serial No. 603,282

7 Claims. (Cl. 260—344)

The present invention relates to the resolution of racemic α hydroxy β,β dimethyl γ butyrolactone. More particularly the present invention relates to the resolution of racemic α hydroxy β,β dimethyl γ butyrolactone by forming d-ephedrine derivatives of the d- and l-α hydroxy β,β dimethyl γ butyrolactone and separating the so formed derivatives.

In U. S. Patent 2,319,545 there is disclosed a process for the resolution of α hydroxy β,β dimethyl γ butyrolactone by treating the lactone with an alkali such as barium or sodium hydroxide to open the ring and form the sodium salt of αγ dihydroxy β,β dimethyl butyric acid and reacting the aforesaid salt with a mineral acid salt of an alkaloid such as quinine sulfate or chloride. Although the aforementioned patent discloses the use of certain other alkaloids such as quinidine, cinchonidine, cinchonine, strychnine and brucine, these other alkaloids have not been considered particularly suitable for the resolution of the lactone and in general only the quinine salts have been used. As is well known, the l-lactone is used, for example, in the synthesis of d-pantothenic acid.

It has now been discovered in accordance with the present invention that d-ephedrine can be used to resolve α hydroxy β,β dimethyl γ butyrolactone. Furthermore, d-ephedrine can be reacted directly with the lactone with the resultant opening of the ring to produce the corresponding d-ephedrine d-αγ dihydroxy β,β dimethyl butyric acid and d-ephedrine l-αγ dihydroxy β,β dimethyl butyric acid compounds. The d-ephedrine-l-αγ dihydroxy β,β dimethyl butyric acid compound and the d-ephedrine d-αγ dihydroxy β,β dimethyl butyric acid compound can be separated from one another by crystallization from suitable solvents or, in the alternative, the ephedrine derivatives can be partially separated from one another and thereafter lactonized and the lactones separated by crystallization from suitable solvents.

It is one of the objects of the present invention, therefore, to provide an economical method for the resolution of α hydroxy β,β dimethyl γ butyrolactone.

A second object of the present invention is to produce novel derivatives of d-ephedrine and αγ dihydroxy β,β dimethyl butyric acid.

A third object of the present invention is to prepare substantially pure l- and d-α hydroxy β,β dimethyl γ butyrolactones by reacting a racemic lactone with d-ephedrine in aqueous solution and thereafter separating the d-ephedrine derivatives by crystallization and/or extraction by means of suitable organic solvents.

Other objects and advantages of the present invention will become apparent from the specification and claims.

In practicing the process of the present invention, racemic lactone is reacted directly in aqueous solution with d-ephedrine to form a mixture of d-ephedrine l-αγ dihydroxy β,β dimethyl butyric acid and d-ephedrine d-αγ dihydroxy β,β dimethyl butyric acid. The water is then removed from the mixture under vacuum at a temperature below approximately 70° C. Thereafter the reaction mixture is dissolved in a suitable solvent such as ethylene dichloride or methyl isobutyl ketone, seeded with d-ephedrine d-αγ dihydroxy β,β dimethyl butyric acid and cooled for a substantial period of time as, for example, three days. Other suitable solvents may also be used as, for example, methylene chloride, trichlorethylene, isopropyl acetate, mixed amyl alcohols, carbon tetrachloride, benzene, etc. However, the preferred solvents are methyl isobutyl ketone and ethylene dichloride. A precipitate is formed which consists largely of d-ephedrine d-αγ dihydroxy β,β dimethyl butyric acid having a melting point, when purified, of 110–112° C. The mother liquor and subsequent washings contain the d-ephedrine l-αγ dihydroxy β,β dimethyl butyric acid derivative. This can be purified by concentrating to remove solvent and recrystallizing from a suitable solvent such as ethylene dichloride. Thereafter if desired, the d-ephedrine l-αγ dihydroxy β,β dimethyl butyric acid may be lactonized to give the d-lactone.

The precipitated d-ephedrine d-αγ dihydroxy β,β dimethyl butyric acid salt after filtration is slurried with a small portion of cold solvent to remove mother liquor and again filtered. The dried salt is then treated with caustic or acid solution to reconstitute the l-lactone. In the event caustic soda is used, the sodium salt of the butyric acid derived from the l-lactone is produced liberating the d-ephedrine. In the event acid is used, the lactone is produced directly.

Where the sodium salt of the butyric acid derived from the lactone is produced, the ephedrine is extracted from the aqueous lactone solution with methyl isobutyl ketone or substantially any organic solvent immiscible with water, since ephedrine is soluble in substantially all organic solvents, the aqueous solution acidified to pH 1 and warmed on a steam bath for ½ hour to lactonize the hydroxy acid. The lactone is then extracted with successive amounts of a suitable solvent such as methylene chloride. Any other solvent for the lactone may also be used in this step such as ether, benzene or carbon tetrachloride. If it is desired to further purify the l-lactone it can be dissolved and recrystallized from a suitable solvent such as benzene and petroleum ether mixtures, methyl isobutyl ketone and petroleum ether mixtures, methyl isobutyl ketone alone, n-amyl alcohol, n-butyl alcohol and fusel oil. Of these, however, the preferred solvents are benzene and petroleum ether mixtures, methyl isobutyl ketone and petroleum ether mixtures, methyl isobutyl ketone. By far the best solvent is methyl isobutyl ketone. In this way a substantially pure l-lactone can be obtained having a rotation of —49.8. Instead of the direct reaction of d-ephedrine and racemic lactone, the salt of ephedrine may be used as, for example, ephedrine sulfate and the alkali or alkaline earth butyric acid salts. Thus ephedrine sulfate and the Ba salt of the butyric acid derived from the lactone may be interacted to produce d-ephedrine and d- and l-lactone derivatives together with barium sulfate which is precipitated and separated. The d-ephedrine-d- and l-lactone derivatives may also be separated in substantially pure form from one another by successive crystallizations and thereafter lactonized instead of utilizing a partial separation as previously outlined followed by separation of the l-lactone from the mixture of l-lactone and d-l-lactone.

The following example serves to illustrate the present invention but is not intended to limit the same.

*Example*

27.88 gs. of d-ephedrine ($[\alpha]_D$ of ephedrine hydrochloride 35) and 21.98 gs. of racemic $\alpha$ hydroxy $\beta,\beta$ dimethyl $\gamma$ butyrolactone were dissolved in 65 ml. of water. The mixture was heated on a steam bath for 10 minutes, cooled and then washed with methylene chloride to remove any unreacted ephedrine. The pH was found to be 8. The reactant mixture was then concentrated under vacuum to remove substantially all water. The residue was taken up in 70 ml. of ethylene dichloride and seeded with the d-ephedrine l-lactone (d-ephedrine-d-$\alpha\gamma$ dihydroxy $\beta\beta$, dimethyl butyric acid) and placed in the refrigerator. In three days a heavy precipitate had formed. This was filtered off and washed or slurried with cold ethylene dichloride to remove mother liquor. The precipitate weighed 16.9 gs. which is equivalent to 67.9% of one isomer and had a melting point of 106° C. This melting point demonstrated that the precipitate was largely d-ephedrine d-$\alpha\gamma$ dihydroxy $\beta,\beta$ dimethyl butyric acid (d-ephedrine l-lactone). The filtrate and washings consisted largely of d-ephedrine l-$\alpha\gamma$ dihydroxy $\beta,\beta$ dimethyl butyric acid (d-ephedrine d-lactone). The precipitate was dissolved in 100 cc. of water and 15 cc. of concentrated HCl were added and the mixture heated for 20 minutes on a steam bath. After cooling, the lactone was extracted with 50, 40, 30 and 30 ml. quantities of methylene chloride. The extracts were dried, filtered and run down. The yield of lactone was 5.53 grams or 79% of theory from the ephedrine lactone salt. Rotation of this lactone was —35.9 which was equivalent to 71% pure l-lactone. It was then recrystallized from 5 cc. of benzene and 2½ cc. of petroleum ether. A yield of 3½ grams and a rotation of —43.8, equivalent to 86.5% l-lactone, was obtained. The mother liquor, i. e. acid solution, consisted largely of d-ephedrine. The ephedrine was recovered from the acid solution by making the solution alkaline and extracting with a suitable organic solvent.

Having described our invention, what we claim as new and desire to secure by Letters Patent is:

1. In a process for the resolution of racemic $\alpha$ hydroxy $\beta,\beta$ dimethyl $\gamma$ butyrolactone, the step which comprises reacting the lactone with d-ephedrine to form a d-ephedrine derivative of l-$\alpha\gamma$ dihydroxy $\beta,\beta$ dimethyl butyric acid and a d-ephedrine derivative of d-$\alpha\gamma$ dihydroxy $\beta,\beta$ dimethyl butyric acid at a temperature below the decomposition temperatures of said ephedrine derivatives.

2. A process for the resolution of racemic $\alpha$ hydroxy $\beta,\beta$ dimethyl $\gamma$ butyrolactone comprising reacting the said lactone with d-ephedrine to form a d-ephedrine derivative of l-$\alpha\gamma$ dihydroxy $\beta,\beta$ dimethyl butyric acid and a d-ephedrine derivative of d-$\alpha\gamma$ dihydroxy $\beta,\beta$ dimethyl butyric acid at a temperature below the decomposition temperatures of said ephedrine derivatives, dissolving the reaction products in a solvent for said ephedrine derivatives and crystallizing the d-ephedrine derivative of d-$\alpha\gamma$ dihydroxy $\beta,\beta$ dimethyl butyric acid therefrom.

3. As a new compound a salt selected from the group consisting of a d-ephedrine salt of l-$\alpha\gamma$ dihydroxy $\beta,\beta$ dimethyl butyric acid and a d-ephedrine salt of d-$\alpha\gamma$ dihydroxy $\beta,\beta$ dimethyl butyric acid.

4. As a new compound the d-ephedrine salt of d-$\alpha\gamma$ dihydroxy $\beta,\beta$ dimethyl butyric acid.

5. As a new compound the d-ephedrine salt of l-$\alpha\gamma$ dihydroxy $\beta,\beta$ dimethyl butyric acid.

6. A process for the resolution of racemic $\alpha$ hydroxy $\beta,\beta$ dimethyl $\gamma$ butyrolactone which comprises reacting the aforesaid lactone with d-ephedrine to form a d-ephedrine derivative of l-$\alpha\gamma$ dihydroxy $\beta,\beta$ dimethyl butyric acid and a d-ephedrine derivative of d-$\alpha\gamma$ dihydroxy $\beta,\beta$ dimethyl butyric acid at a temperature below the decomposition temperatures of said ephedrine derivatives, dissolving the reaction products in a solvent for said ephedrine derivatives, crystallizing the d-ephedrine derivative of d-$\alpha\gamma$ dihydroxy $\beta,\beta$ dimethyl butyric acid from the solution, lactonizing the d-ephedrine d-$\alpha\gamma$ dihydroxy $\beta,\beta$ dimethyl butyric acid to produce l-$\alpha$ hydroxy $\beta,\beta$ dimethyl $\gamma$ butyrolactone, dissolving the l-lactone in a solvent for the l-lactone, and cooling the solution to precipitate purified l-$\alpha$ hydroxy $\beta,\beta$ dimethyl $\gamma$ butyrolactone therefrom.

7. A process for the resolution of racemic $\alpha$ hydroxy $\beta,\beta$ dimethyl $\gamma$ butyrolactone which comprises reacting the aforesaid lactone with d-ephedrine to form a d-ephedrine derivative of l-$\alpha\gamma$ dihydroxy $\beta,\beta$ dimethyl butyric acid and a d-ephedrine derivative of d-$\alpha\gamma$ dihydroxy $\beta,\beta$ dimethyl butyric acid at a temperature below the decomposition temperatures of said ephedrine derivatives, dissolving the mixtures of the butyric acid compounds in a solvent, crystallizing the d-ephedrine derivative of d-$\alpha\gamma$ dihydroxy $\beta,\beta$ dimethyl butyric acid from the solution, lactonizing the d-ephedrine d-αγ dihydroxy β,β dimethyl butyric acid to produce l-α hydroxy β,β dimethyl γ butyrolactone, dissolving the lactone in methyl isobutyl ketone, and cooling the solution to precipitate purified l-α hydroxy β,β dimethyl γ butyrolactone therefrom.

FRANK D. PICKEL.
JACOB I. FASS.
SAUL CHODROFF.

REFERENCES CITED

The following references are of record in the file of this patent:

UNITED STATES PATENTS

| Number | Name | Date |
|---|---|---|
| 2,319,545 | Harris et al. | May 18, 1943 |
| 2,328,000 | Finkelstein | Aug. 31, 1943 |

OTHER REFERENCES

Organic Chemistry—An Advanced Treatise, by Gilman, vol. I, 2nd edition (1943), pp. 254–259.

Certificate of Correction

January 25, 1949.

Patent No. 2,460,239.

FRANK D. PICKEL ET AL.

It is hereby certified that error appears in the printed specification of the above numbered patent requiring correction as follows:

Column 4, lines 73 and 74, claim 7, strike out "mixtures of the butyric acid compounds in a solvent" and insert instead *reaction products in a solvent for said ephedrine derivatives*;

and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*